Oct. 25, 1949.   M. A. CHAVANNES   2,486,259
METHOD FOR PRINTING ON THERMOPLASTIC
SHEET-LIKE MATERIAL
Filed Sept. 6, 1947
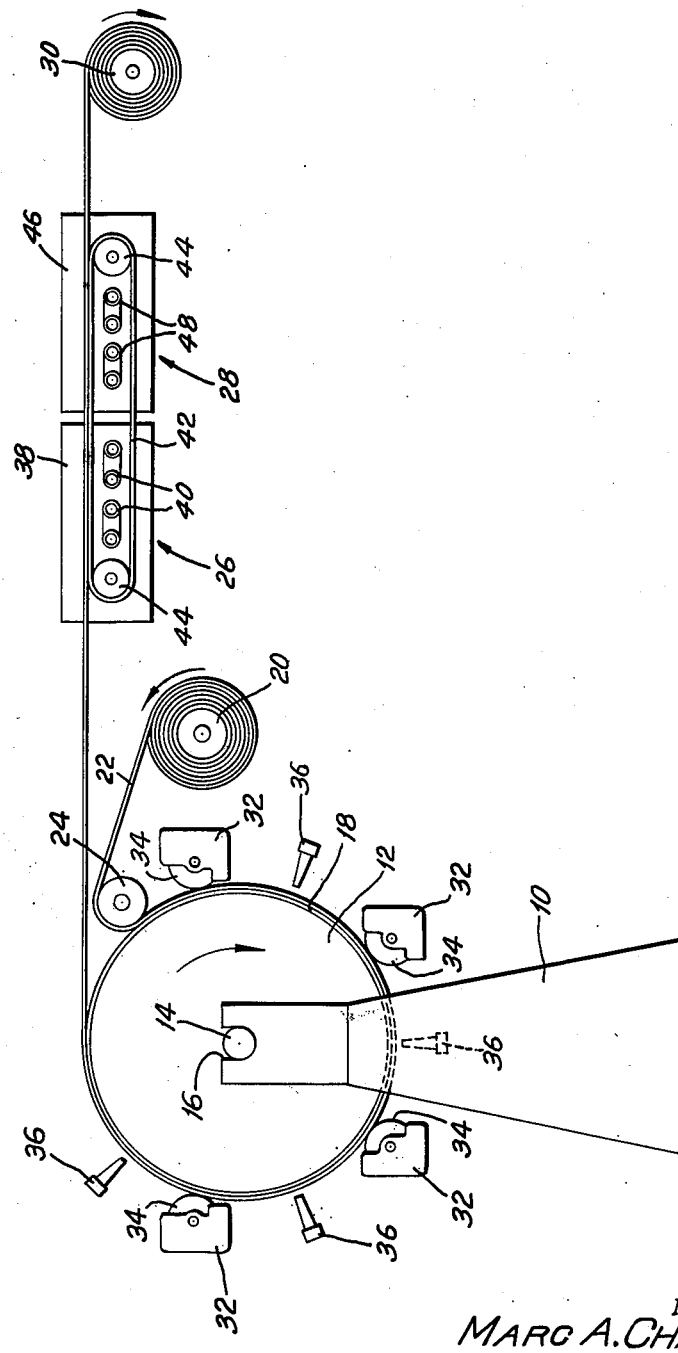
INVENTOR.
MARC A. CHAVANNES
BY
ATTORNEYS Patented Oct. 25, 1949

2,486,259

UNITED STATES PATENT OFFICE 2,486,259

METHOD FOR PRINTING ON THERMOPLASTIC SHEETLIKE MATERIAL

Marc A. Chavannes, Lisbon, Conn.

Application September 6, 1947, Serial No. 772,490

5 Claims. (Cl. 101—211)

1

The present invention relates to a process for printing on or applying designs to thermoplastic sheet-like material such as a film or a calendered sheet. While the process and apparatus are generally applicable to printing on thermoplastic materials of substantially any type, they are particularly valuable when used for printing in a plurality of colors on sheeting or film of the vinyl resin type.

In general, for a printed design to have any practical degree of permanence, the ink or other coloring material must be bonded with the material to which it is applied. Thus, as is well-known, printer's ink becomes bonded to paper by virtue of the fact that the paper absorbs to some extent the vehicle and coloring material making up the printing ink. The thermoplastic materials now widely used in the manufacture of films and calendered sheeting are of such nature that they are substantially incapable of forming a bond by absorption in a manner comparable to the absorption by paper of a printing ink. Instead, with printing processes employed heretofore, areas of the plastic film may be attacked and locally dissolved by the vehicle of the ink, and as a result the film may buckle to a serious extent. This buckling makes it almost impossible to print in successive colors with accurate registration.

An object of the present invention is to provide apparatus and a method for applying printed patterns in any desired number of colors to thermoplastic sheet-like materials such as a film or calendered sheeting with proper registration and without smearing, buckling or other undesirable effects.

A further object of the present invention is to apply printed designs to thermoplastic film in such a way that they adhere permanently to the film and are relatively free from any tendency to wear away.

According to the present invention, any desired design may be printed in any desired number of colors upon a thermoplastic sheet-like material such as a film or calendered sheeting using liquid ink or inks which will not attack the thermoplastic material. Preferably the ink contains a thermoplastic resinous substance and a liquid vehicle which will not attack the thermoplastic material to which it is to be applied. The printed design thus applied is dried by evaporation of the liquid vehicle, and the thermoplastic film with the design thereon is then passed through a zone in which it is heated to such a temperature as to render the thermoplastic film and the thermoplastic ink sufficiently plastic to become fused

2 together. After the printed film or sheeting is cooled, the printing thereon will be unusually permanent. With this process, no difficulty will be encountered from the standpoint of buckling, smearing and the like as discussed hereinabove.

The above-mentioned, as well as other objects, together with the many advantages obtainable by the practice of the present invention, will be readily comprehended by persons skilled in the art by reference to the following detailed description taken in connection with the annexed drawing which respectively describe and illustrate a preferred embodiment of the invention. The drawing is a schematic side elevational view of apparatus for printing on film or sheet material in accordance with the teachings of the present invention.

In the drawing, a standard 10 supports a large drum or roller 12 carried by a shaft 14 mounted for rotation in suitable bearings 16 provided in the standard 10. The drum or roller 12 may be made of metal or other suitable material and is preferably provided with a surface layer or jacket 18 made of rubber or other suitable resilient material for backing the work while the printing operation is carried out, as will be described hereinbelow.

A reel 20 is mounted for rotation in a suitable support, not shown. The reel 20 carries a continuous web 22 of thermoplastic material such as a film or calendered sheeting. The web 22 is drawn from the reel 20, over a guide roller 24 into facewise engagement with the surface 18 of the drum 12 and extends around the drum for a distance sufficient to enable printing on the exposed surface thereof with as many different colors of ink as may be desired. As shown in the drawing, the web 22 extends almost completely around the drum in a looped configuration and leaves the drum generally horizontally, passing back over the reel 20. The web 22, after leaving the drum 12, is conducted through a drying oven 26 and a fusing oven 28 from which it emerges to be wound upon a driven take-up reel 30.

A plurality of fountains 32, one for each color desired, are spaced around the drum 12 at proper intervals. Each fountain 32 includes an applicator roller 34 the surface of which is supplied with a liquid printing ink carried within the fountain 32. It will be understood that the surfaces of the applicator rollers 34 may be supplied with ink by directly dipping into the body of ink within the fountain or through other arrangements, for example, a series of distributor rollers within the fountain. The applicator rollers 34 are each etched, engraved, or otherwise formed with a suitable design in the surface thereof as, for example, a plurality of half-tone dots, for the purpose of printing a desired pattern of colored ink.

Preferably the ink applied by one of the fountains 32 is at least partly dried or surface-dried before it reaches the next succeeding fountain in order that the colors may remain clear and distinct, as will be understood by those skilled in the art of multiple color printing. While in some instances the distance between successive fountains 32 may be sufficient to permit the ink to dry merely by exposure to the atmosphere as it passes from one fountain to the next, the drying operation may be accelerated by the use of air blasts and the like if so desired. Thus, as shown in the drawing, an air nozzle 36 is provided between each of the fountains 32 and after the last fountain 32. These nozzles may be used to supply heated air or air at normal temperatures as may be required by the particular ink composition used. The air nozzle 36 positioned after the last fountain 32 may in some cases be dispensed with altogether if so desired even though the remaining air nozzles are used.

When the web 22 of thermoplastic material comprises a vinyl resin type of film, it is preferred to use as an ink a water dispersion of a vinyl resin, a plasticizer and a pigment. Different pigments or mixtures of pigments may be used in the different fountains 32 for the production of a multi-color effect.

As an example, one ink which has been found satisfactory for use in producing a white design is a dispersion having the following composition.

| | Parts by weight |
|---|---|
| Vinyl acetate-chloride copolymer | 7 |
| Dioctyl phthalate | 2 |
| Titanium dioxide | 1 |
| Water | 25 |

The vinyl acetate-chloride copolymer mentioned above may have a molecular weight in the neighborhood of 8000 units.

Such ink, being a water dispersion, will not attack the vinyl resin film 22 and may be smoothly and evenly applied to the web by the applicator rollers of the fountains, which press the web 22 against the resilient backing provided by the jacket 18 on the drum 12. The water dispersion of vinyl resin should be at least partially dried, as previously indicated, such as by use of the air nozzles 36, as it moves from one fountain 32 to the next. After the web leaves the last fountain 32, the printed design will be complete, but it will not be securely bonded to the film, merely resting thereon. The web 22 then advances to the drying oven 26 wherein the water is completely evaporated from the vinyl resin inks.

The drying oven 26 may take any suitable form and may be heated from any convenient source. In the drawing, for example, the drying oven 26 may comprise a tunnel 38 provided with steam pipes 40. An oven conveyor 42 may be carried by suitable rollers 44 one of which is positioned within the drying oven 26 and the other of which may be positioned in the fusing oven 28. The conveyor 42 may be driven from any suitable source of power or may merely be allowed to idle if so desired.

From the drying oven 26 the web may be carried into the fusing oven 28 in which a temperature is maintained which is sufficiently high to bring about a fusion between the ink and the film.

The fusing oven 28 may taken any suitable form and as shown in the drawing, may comprise a tunnel 46 having steam pipes 48 positioned therein. The web 22 may be conducted through the fusing oven as by the conveyor 42 described above.

In the particular case wherein a vinyl resin film comprises the web 22 and a water dispersion of a vinyl resin plastic of the type mentioned is used as the major constituent of the inks, the temperature of the drying oven may be approximately 200° F., for example, and the temperature of the fusing oven may be approximately 350° F., for example. Because it is in a thin layer, the ink has some tendency to become plastic at a lower temperature than does the film. It is preferable to use an ink the composition of which enhances this tendency, so that a fusing temperature may be used capable of softening the ink considerably for the purpose of binding it to the film, without softening the film to such an extent that it would become distorted in shape. For example, the ink and film may be of similar resin copolymers, but the ink may be of a lower average molecular weight and may have a lower melting point. In general, fusing may satisfactorily be accomplished at the temperature at which the resin binder in the ink would heat-seal to itself.

After leaving the fusing oven 28, the web may be wound upon the reel 30, the web and ink being permitted to cool at room temperature during travel from the fusing oven 28 to the reel 30. Supplemental cooling means may be provided if needed; for example, air nozzles, not shown, may be so disposed as to distribute relatively cool air upon one or both of the surfaces of the web 22 after it leaves the fusing oven 28 and before it reaches the reel 30.

The principles which govern the selection of proper thermoplastic film or sheet materials and the proper thermoplastic inks for use thereon are believed to have been clearly set forth above. In summary, it should be stated that for any particular thermoplastic material in the web 22 the printing ink should have the following properties: (1) in its liquid form as applied by the printing apparatus, it must not attack the material in the web 22 as by partially dissolving, swelling or softening the same; (2) it must be thermoplastic and capable of fusing with the material of the web 22 at a temperature which is appropriate for rendering the web 22 sufficiently plastic to fuse therewith without damage or other alteration in the form or character of the web 22.

While a suitable form of apparatus and mode of procedure, to be used in accordance with the invention, and various improved products resulting therefrom have been described in some detail, and certain modifications have been suggested, it will be understood that numerous changes may be made without departing from the general principles and scope of the invention.

I claim:

1. A method for decorating thermoplastic sheet-like material comprising the steps of printing on said material with an ink, said ink comprising a pigmenting substance, a thermoplastic binder, a plasticizer and a liquid vehicle which will not attack said material, drying said ink, and subjecting said material and said ink to a temperature sufficiently high to fuse them together.

2. A method for decorating plastic sheeting comprising the steps of applying to said sheeting a design of a thermoplastic ink incapable of attacking said sheeting, drying said design, and fusing said design with said sheeting at a temperature sufficiently high to render said ink plastic and tacky, but not high enough to appreciably soften said sheeting.

3. A method for applying a design to a resinous film comprising the steps of passing said film around a large drum, applying to said film with a plurality of fountains cooperating with said drum a multi-colored design of inks comprising pigmenting substances, thermoplastic binders and liquid vehicles which are not solvents for said film, removing said liquid vehicles by evaporation, and heating said film and said design to a temperature sufficient to soften said design and bind same to said film, but not great enough to distort said film.

4. A method for decorating sheet-like resinous material comprising the steps of printing on said material with an ink, said ink comprising resin having a lower molecular weight and lower softening temperature than the resin of said material, and a liquid vehicle which will not attack said material, drying said ink, and heating said material to a temperature sufficiently high to render said ink tacky and to bond said ink to said material.

5. A method for applying a multi-color design to plastic sheeting of the vinyl resin type, said method comprising printing portions of said design on said sheeting in successive steps with differently colored inks, said inks each comprising a vinyl resin, a plasticizer, a pigment, and water, partially drying said portions of said design between said printing steps, thereafter completely drying said designs and heating said material and said designs to a fusing temperature.

MARC A. CHAVANNES.

REFERENCES CITED

The following references are of record in the file of this patent:

UNITED STATES PATENTS

| Number | Name | Date |
|---|---|---|
| 2,337,348 | Prindle | Dec. 21, 1945 |